(12) United States Patent
McMahan et al.

(10) Patent No.: US 12,377,732 B2
(45) Date of Patent: Aug. 5, 2025

(54) ELECTRICAL SHUNT APPARATUS AND SYSTEM

(71) Applicant: Transportation IP Holdings, LLC, Norwalk, CT (US)

(72) Inventors: Travis McMahan, Honea Path, SC (US); Steven J. Knox, II, Pittsburgh, PA (US); Gary Piotrowski, Greenville, SC (US); Stacy Neil Smith, Simpsonville, SC (US)

(73) Assignee: Transportation IP Holdings, LLC, Norwalk, CT (US)

( * ) Notice: Subject to any disclaimer, the term of this patent is extended or adjusted under 35 U.S.C. 154(b) by 828 days.

(21) Appl. No.: 17/580,858

(22) Filed: Jan. 21, 2022

(65) Prior Publication Data
US 2022/0266696 A1    Aug. 25, 2022

Related U.S. Application Data

(60) Provisional application No. 63/151,498, filed on Feb. 19, 2021.

(51) Int. Cl.
*B60L 5/38* (2006.01)
(52) U.S. Cl.
CPC ..................... *B60L 5/38* (2013.01)
(58) Field of Classification Search
CPC .................. B60L 5/38; H01R 11/11
See application file for complete search history.

(56) References Cited

U.S. PATENT DOCUMENTS

| | | | |
|---|---|---|---|
| 1,722,046 A * | 7/1929 | Fuller | H01H 9/44 361/13 |
| 2,093,459 A * | 9/1937 | Logan, Jr. | B61H 7/08 188/165 |

(Continued)

FOREIGN PATENT DOCUMENTS

| | | | | |
|---|---|---|---|---|
| CA | 1286376 C | * | 7/1991 | ............. H01R 13/33 |
| CN | 205417201 U | * | 8/2016 | |

(Continued)

OTHER PUBLICATIONS

Extended European Search Report for corresponding European Patent Application No. 22 154 195.6 dated Oct. 12, 2022 (18 pages).

(Continued)

*Primary Examiner* — Jason C Smith
(74) *Attorney, Agent, or Firm* — K&L Gates LLP

(57) ABSTRACT

A shunt apparatus includes a mounting bracket assembly configured for connection to a vehicle, an actuator connected to the mounting bracket assembly, and a shoe unit connected to the actuator. The actuator is controllable to move the shoe unit to an extended position where a conductive shoe of the shoe unit is positioned to contact a conductive first running surface on which the vehicle travels. The shoe unit includes a resilient biasing assembly that is configured to exert a force on the shoe, to press the shoe against the running surface during movement of the vehicle. Two of the shunt apparatuses may be attached to opposite sides of the vehicle. The shoes of the two shunt apparatuses are electrically connected to one another by an electrical cable. When the shoes are brought into contact with respective running surfaces, the running surfaces are electrically shunted for vehicle signaling purposes or otherwise.

19 Claims, 7 Drawing Sheets

(56) References Cited

U.S. PATENT DOCUMENTS

| | | | | |
|---|---|---|---|---|
| 5,052,940 | A | * | 10/1991 | Bengal ............ H01R 13/65912 |
| | | | | 439/468 |
| 5,673,774 | A | * | 10/1997 | Trapp ...................... B60L 5/39 |
| | | | | 191/64 |
| 6,089,874 | A | * | 7/2000 | Kroulik ............... H01R 35/025 |
| | | | | 439/11 |
| 6,230,861 | B1 | * | 5/2001 | Cornic .................... B60M 1/10 |
| | | | | 191/23 R |
| 6,254,411 | B1 | * | 7/2001 | Chapman ............. H01R 29/00 |
| | | | | 439/189 |
| 6,632,099 | B2 | * | 10/2003 | Rygwelski, Jr. ... H01R 13/7031 |
| | | | | 439/482 |
| 10,476,184 | B2 | * | 11/2019 | Menez ............. H01M 10/6556 |
| 11,191,180 | B2 | * | 11/2021 | Palomo Lorenzo ... H05K 1/182 |
| 11,287,228 | B2 | * | 3/2022 | Haddon .................. F42B 3/182 |
| 11,909,136 | B2 | * | 2/2024 | Chen ...................... H01R 11/09 |
| 2008/0194152 | A1 | * | 8/2008 | Roset .................. H01R 11/281 |
| | | | | 439/754 |
| 2018/0172736 | A1 | * | 6/2018 | Makinson ............... G01R 1/203 |
| 2022/0329027 | A1 | * | 10/2022 | Becker .................. H02J 7/0045 |
| 2024/0092179 | A1 | * | 3/2024 | Sobierajski ........... B60L 3/0061 |
| 2024/0145972 | A1 | * | 5/2024 | Jeffries .................. H01R 24/38 |

FOREIGN PATENT DOCUMENTS

| | | | | |
|---|---|---|---|---|
| CN | 106809017 | A | | 6/2017 |
| CN | 107709083 | A | * | 2/2018 ................ B60L 5/42 |
| GB | 2084096 | A | * | 4/1982 ................ B60L 5/38 |
| GB | 2105926 | A | * | 3/1983 ............. H01B 9/001 |
| GB | 2357271 | A | * | 6/2001 .............. B60M 5/38 |
| GB | 2369336 | B | * | 2/2004 ................ B60L 5/38 |
| JP | S46-009284 | Y | | 4/1971 |
| JP | S51-107707 | U | | 8/1976 |
| JP | S55-122401 | A | | 9/1980 |
| JP | H3-11301 | U | | 2/1991 |
| JP | 2013198379 | A | | 9/2013 |
| JP | 2019537917 | A | | 12/2019 |
| WO | 2015146393 | A1 | | 10/2015 |
| WO | 2018086689 | A1 | | 5/2018 |

OTHER PUBLICATIONS

Office Action for corresponding JP Patent Application No. 2022-020610 dated Aug. 28, 2023 (18 pages).

Partial European Search Report for corresponding European Patent Application No. 22 154 195.6 dated Jul. 11, 2022 (22 pages).

* cited by examiner

ELECTRICAL SHUNT APPARATUS AND SYSTEM

CROSS-REFERENCE TO RELATED APPLICATIONS

This application claims priority to U.S. Provisional Application No. 63/151,498 (filed 19 Feb. 2021), the entire disclosure of which is incorporated by reference herein.

BACKGROUND

Technical Field

Embodiments of the subject matter herein relate to electrical shunts. Other embodiments relate to electrical shunts for vehicles.

Discussion of Art

Some vehicle control systems utilize shunt connections onboard a vehicle for electrically interconnecting or shorting two adjacent, conductive running surfaces on which the vehicle operates, e.g., two sections of parallel rail track. The running surfaces are shunted for establishing an electrical connection therebetween, e.g., for purposes of determining a location of the vehicle along a route of the running surfaces using signaling techniques. The shunt connection is established by the conductive (e.g., metal) traction components of the vehicle, namely, an electrical connection that extends from the one running surface, through a first metal wheel of the vehicle, through a metal axle of the vehicle, to a second metal wheel of the vehicle (the wheels are connected to the axle), and then from the second metal wheel to the second running surface. However, due to the complex operational environment in which such vehicles operate, wheel-and-axle shunts may not provide enough connectivity (timewise, and/or in terms of signal strength) for certain vehicle control applications. For example, substances like water or ice on the running surface may cause temporary interruptions in the electrical connection between a wheel and running surface.

Therefore, it may be desirable to provide an electrical shunt assembly or system that differs from existing devices.

BRIEF DESCRIPTION

In an embodiment, a shunt apparatus includes a mounting bracket assembly configured for connection to a vehicle, an actuator connected to the mounting bracket assembly, and a shoe unit connected to the actuator. The actuator is controllable to move the shoe unit to an extended position (e.g., from a retracted position to the extended position) where, when the apparatus is deployed onboard the vehicle, a conductive shoe of the shoe unit is positioned to contact a conductive first running surface (e.g., of a metal rail) on which the vehicle travels. The shoe unit includes a resilient biasing assembly that is configured to exert a force on the shoe, to press the shoe against the running surface during movement of the vehicle.

In embodiments, two of such shunt apparatuses may be attached to opposite sides of the vehicle. The shoes of the two shunt apparatuses are electrically connected to one another by a cable or other electrical conductor unit, e.g., which extends under or through the vehicle between the sides of the vehicle. When the shoes are brought into contact with respective running surfaces, the running surfaces are electrically shunted.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
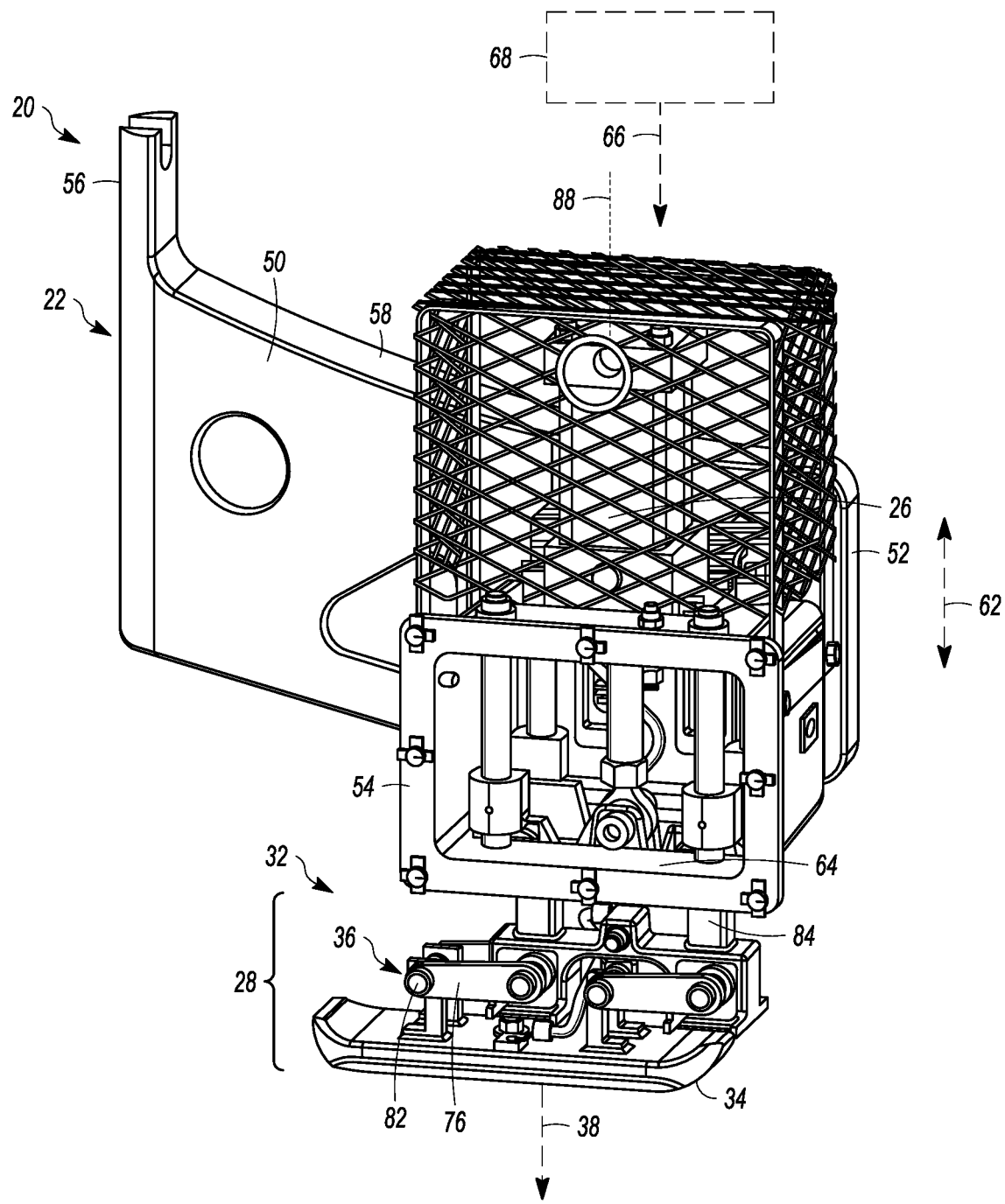
FIG. 1 illustrates a first embodiment of a shunt apparatus.

Embodiments of the subject matter described herein relate to electrical shunt systems for vehicles, e.g., for electrically shunting conductive running surfaces on or along which a vehicle operates, for vehicle location determination or other signaling purposes. In one aspect, a shunt apparatus may include a mounting bracket assembly configured for connection to a vehicle, an actuator connected to the mounting bracket assembly, and a shoe unit connected to the actuator. The actuator is controllable to move the shoe unit from a retracted position to an extended position. The shoe unit includes a conductive shoe, and a biasing assembly that is configured to exert a force on the shoe, e.g., in the direction of the extended position. When the apparatus is operably deployed onboard a vehicle and the actuator is controlled to move the shoe unit to the extended position, the conductive shoe is positioned to contact a conductive first running surface on which the vehicle travels. Concurrently, the biasing assembly presses the shoe against the running surface, for maintaining contact between the shoe and running surface despite surface irregularities, debris on the surface, etc.

In embodiments, two of such shunt apparatuses may be attached to opposite sides of the vehicle. The shoes of the two shunt apparatuses are electrically connected to one another by a cable or other electrical conductor unit, e.g., which extends under or through the vehicle between the sides of the vehicle. When the shoes are brought into contact with respective running surfaces, the running surfaces are electrically shunted.

According to one aspect, the shunt apparatuses may be deployed in pairs onboard a vehicle, e.g., there may be one pair, two pairs, or more than two pairs. For each pair, one shunt apparatus is positioned on one side of the vehicle relative to a first conductive running surface, and another shunt apparatus is positioned on the other side of the vehicle relative to a second conductive running surface. The two shunt apparatuses are electrically connected to one another by an electrical conductor unit (e.g., a single electrical cable, or plural electrically interconnected conductive pathways). When the actuators of the shunt devices are controlled (e.g., actuated) to move the shoe units to the extended position, the shoes contact the running surfaces, and the running surfaces are thereby electrically shunted through the shoes and electrical cable unit. The electrical shunt is an electrical connection with substantially little resistance (e.g., in one embodiment, no more than 50 milli-ohms, and in another embodiment, no more than 10 milli-ohms) or corresponding voltage drop between the running surfaces. Shunting the running surfaces may result in the generation of electrical signal information through the running surfaces (e.g., application or interruption of a signal), for vehicle location determination in a known manner, or other vehicle signaling purposes.

As noted, the running surfaces are electrically conductive, and the vehicle is configured to travel over and/or along the running surfaces. For example, the running surfaces may be the top surfaces or other surfaces of parallel metal rails, and the vehicle may be a rail vehicle, such as a locomotive. In other examples, the running surfaces could be surfaces of metal guideways along the sides of a route, electrical conductors over or under a vehicle that are used for communications or other purposes, metal roadway strips for haul trucks, mine carts, automobiles, etc., or the like. The vehicle may be configured to sit on the running surfaces, but this is not necessarily the case for every application, e.g., "running" means a vehicle may operate on, or along, or near the surfaces.

In embodiments, the conductive shoes are made of ductile iron, in whole or in part. For example, the entire conductive shoe may be made of cast gray iron, ductile iron (e.g., cast iron), steel (e.g., cast or other steel), or a bottom portion of the shoe which is configured to contact a running surface may be made of ductile iron, with the rest of the shoe being made of one or more other materials. Other possible materials include other types of iron, steel, copper, other conductive metals, metal composites, composites of metal(s) and other materials, and so on. Generally, though, it may be desirable to use a material or materials that are both durable and have low resistivity/high conductance. In one aspect, the shoes are solid blocks or other bodies of metal or other conductive material(s). The bodies may be generally-rectangular, generally-elongate solids having a length, a width that is shorter than the length, and a thickness that is shorter than the width. The width may correspond to the width of the running surface. In other aspects, the shoes may include flexible conductive brushes that are configured to contact the running surfaces. Bottom surfaces or edges of the shoes (that is, the surfaces of the shoes that are configured and positioned to contact the running surfaces) may be flat, or they may be provided with grooves, recesses, voids, etc. for reducing a level of running friction between the shoes and running surfaces while still maintaining a desired level or degree of electrical connection.

In one embodiment, leading and/or trailing edges of the shoes (in the direction of forward or reverse travel along the running surfaces, respectively) are shaped and/or made of a material, the same or different from other portions of the shoe, not specifically for electrical connection with the running surface, but rather to scrape or otherwise mechanically condition the running surface ahead of the shoe. For example, the shoes could be provided with a leading-edge portion of a ceramic, polymer, or other high-strength material that can withstand sudden shock forces. In operation, the leading-edge portion would scape foreign material off the running surface ahead of the shoe, thereby reducing vibrational or shock interactions between the running surfaces and shoes, instances of shoe-surface disconnection, etc. Alternatively, leading and trailing edges of the shoe may be raised or lipped, such that the leading and trailing edges are positioned slightly away from the running surface when the main portion of the shoe is in contact with the running surface, to reduce impact shock from debris (e.g., the debris passes under the leading or trailing edge without yet contracting the shoe, for the shoe to slide over the debris instead of impacting the debris with a leading show edge).

In embodiments, the actuator of a shunt apparatus may be a device that is configured to receive a control signal and, responsive to the control signal, to extend and/or retract (a working member or other portion of the actuator) to move a shoe unit. Depending on the type of actuator, the control signal may be an electric signal (e.g., application or removal of electrical power according to designated waveforms), a hydraulic pressure (e.g., application or removal of a pressurized liquid), a pneumatic pressure (e.g., application or removal of a pressurized gas), and so on. Control signals may be generated, directly or indirectly, automatically or manually, by a vehicle control system or other control system, e.g., a microprocessor-based controller, an electromechanical control system, one or more mechanical switches or valves, etc.

In one embodiment, the actuator may be a pneumatic bellows. The pneumatic bellows includes two end plates that are interconnected by a flexible bag member (e.g., sheath, cylindrical wall, or the like), which is inflatable (collapsible and expandable) and defines a gas-tight interior space. The bag member may be made of a polymer, polymer composite, naturally occurring membrane, etc. When depressurized, the bag member lies in a collapsed state, or at least is free to collapse, such that the end plates may lie relatively close to one another. The bellows includes an ingress aperture in one of the plates, which is configured for connection to a pneumatic line of a vehicle. A controllable valve is pneumatically connected to the pneumatic line, to control application of a pressurized gas (e.g., air) to the pneumatic line, from a pressure source onboard the vehicle, e.g., an air compressor reservoir. When the valve is opened, the pressurized gas enters the interior space of the bellows, which causes the bag member to expand and the opposite end plate to move away from the end plate having the ingress aperture. This movement causes the shoe unit to move to the extended position.

Optionally, the actuator may be a pneumatic cylinder that can receive pressure (e.g., air, another gas, or a liquid) to cause the pneumatic cylinder to expand (e.g., when pressurized) and to contract or return to a non-expanded state (e.g., when de-pressurized). The controllable valve may be pneumatically connected to the pneumatic line, to control application of a pressurized gas to the pneumatic line, from a pressure source onboard the vehicle, e.g., an air compressor reservoir. When the valve is opened, the pressurized gas enters the interior space of the cylinder, which causes the cylinder to expand or lengthen. This movement causes the shoe unit to move to the extended position. The cylinder may automatically contract or return to the non-extended state upon closure of the valve or when the gas pressure is no longer applied to the cylinder (e.g., via the valve).

In other embodiments, the actuator may be a hydraulic bellows, e.g., a device as generally described above but that operates upon application of a pressurized liquid. In such a case, the bellows would be configured to be connected to, for example, a hydraulic pump, a hydraulic supply line of a vehicle, or the like.

In other embodiments, the actuators may be hydraulic cylinders, pneumatic cylinders, or other mechanical fluidic actuators; or they may be electrically-powered actuators such as push-pull solenoids or other linear solenoids (e.g., devices where electrically energizing a coil causes a rod or piston to move linearly for a work action), motor-driven linearly-moving arm members, or the like. For a hydraulic cylinder, the hydraulic cylinder would be configured to be hydraulically connected to a source of pressurized liquid, e.g., a hydraulic pump (integral to the hydraulic cylinder or otherwise) or hydraulic supply line. Similarly, a pneumatic cylinder would be configured to be pneumatically connected to a compressor, pneumatic supply line, or the like.

The actuators may be configured to be controllable, upon application of respective control signals, to both move the shoe units from the retracted position to the extended position and to move the shoe units from the extended position to the retracted position. Alternatively, the actuators may be configured to move the shoe units from the retracted position to the extended position, with return of the shoe units to the retracted position carried out, when the actuators are deactivated (e.g., de-pressurized or de-energized), by an automatic return device/component provided in the shunt apparatus. For example, in one embodiment the shunt apparatus includes at least one extension elastic member that interconnects the mounting bracket assembly and shoe unit. ("Elastic member" refers generally to springs, polymer bands, other polymer members, etc. that can be compressed, stretched, twisted, or otherwise loaded to store mechanical energy, and that tend to revert to an unloaded state. An extension elastic member is one that stretches out or extends when loaded, and that exerts a force in a direction opposite the direction of extension. Examples include extension springs and rubber bands or other polymer bands.) When the pneumatic bellows or other actuator is deactivated (e.g., a pressure source is removed from the bellows), the extension elastic member(s) is free to automatically spring back or otherwise retract to an unloaded state, pulling the shoe unit back into the retracted position.

The extension elastic member(s) or other automatic return device is configured to move the shoe unit back to the retracted position when the actuator is controllably deactivated or de-actuated. The automatic return device also serves to move the shoe unit back to the retracted position if the actuator fails or is otherwise unintentionally deactivated. For example, in the case of pneumatic bellows, unintentional deactivation could result from an air bag (e.g., one or more of the bellows) being punctured (and thereby losing pressure), the pneumatic line of the vehicle dropping in pressure due to a vehicle system fault, or the like. Another example is a push-pull solenoid losing electrical power due to a vehicle electrical fault. Automatically retracting the shoe units in this manner may be desirable from a failsafe standpoint, e.g., a system failure or fault results in the shoe units being automatically mechanically retracted to a designated deactivated or safe position.

In one embodiment, the shut apparatus includes two or more extension springs (as an automatic return device) that interconnect the shoe unit and mounting bracket assembly. For example, there may be two extension springs positioned on either side of the actuator, or four extension springs positioned at equal intervals around the actuator. Other examples of possible automatic return devices include other types of elastic members, levered counterweights, or hydraulic or pneumatic cylinders that retract a working member (e.g., rod or piston) upon loss of operational pressure.

In embodiments, the shoe unit may include a resilient biasing assembly. The biasing assembly interconnects the actuator and the conductive shoe, and includes one or more resilient (flexible or otherwise movable) components that provide the shoe with a range of travel to move towards and away from the actuator. The biasing assembly is configured to exert a force on the conductive shoe in a direction of the running surface. The applied force is in addition to any force(s) applied by the actuator, and may be a function of how close the shoe unit is positioned relative to the running surface when the shoe unit is in the extended position. (As discussed hereinbelow, in embodiments, the distance between the shoe unit and running surface is adjustable, by way of a height adjustment feature of the mounting bracket assembly, or the like.) In one embodiment, the biasing assembly is configured to exert a force of from 80 to 100 Newtons on the conductive shoe against the running surface when the shoe unit is in the extended position. This facilitates tracking of the shoe along and in contact with the running surface despite surface irregularities, debris, etc.

In one embodiment, the biasing assembly includes a support member (e.g., support plate) connected to the moving end of the actuator and at least two torsion units. Each torsion unit includes a respective torsional elastic member (e.g., torsion spring) operably connected to the support member and a pair of pivot arms. First ends of the pivot arms are operably connected to the torsional elastic member, and the conductive shoe is pivotally attached to second ends of the pivot arms. In operation, when the shunt apparatus is deployed onboard a vehicle and positioned in a designated manner relative to a running surface, and when the shoe unit is in the retracted position, the torsional elastic member is unloaded, with the pivot arms and shoe lying in an extended position away from the support member. Moving the shoe unit towards its extended position initially brings the shoe into contact with the running surface. Moving the shoe unit fully to its extended position causes the shoe to press against the running surface. This in turn causes the pivot arms to pivot towards the support member, loading the torsional elastic member. In its loaded state, the torsional elastic member exerts a force on the pivot arms which translates to the force applied to the shoe against the running surface. For example, if the shoe encounters debris on a running surface, or a protuberance or bump or the like, the shoe moves upwards against the action of the torsional elastic member, but then once the debris, bump, protuberance, etc. is past, the torsional elastic member forces the shoe back down, maintaining contact or at least minimizing instances or durations of shoe-surface separation. The pivot arms allow the shoe to pivot relative to the surface to avoid damaging the shoe. For example, in some known shunt connections onboard vehicles, the shoes that contact the running surfaces may be limited to moving upward and downward relative to the running surfaces. If the shoes encounter an obstacle on the surface, the direction of movement of the shoe and the force on the shoe are generally perpendicular. This can result in larger mechanical shocks to the shoes, which may result in the shoes being ripped off the vehicle or otherwise damaged. But the pivot arms of at least one embodiment of the inventive subject matter allow for the shoes to move in at least two directions (that are not merely opposite directions). Specifically, the pivot arms can allow the shoes to move both upward and pivot rearward (relative to a direction of movement). If a shoe encounters an obstacle, the force is more in line with the direction of possible movement of the shoe, and at least some of the force is alleviated by the shoe moving in the direction away from the force. For example, the shoe may both move upward away from the surface and the obstacle and may pivot in a rearward direction. This can result in much less stress on the shoe because the shoe can move, at least in part, in the direction away from the force.

In other embodiments, the biasing assembly may include a spring-loaded scissor-arm assembly, simple compression springs, shock absorbers, or the like.

Turning now to FIGS. 1-4 of the drawings, FIG. 1 shows a first embodiment of a shunt apparatus 20 having a mounting bracket assembly 22 configured for connection to a vehicle 24 (see FIG. 2), an actuator 26 connected to the mounting bracket assembly, and a shoe unit 28 connected to the actuator. The actuator is controllable to move the shoe unit from a retracted position 30 (see FIG. 4) to an extended position 32 (see FIG. 1 and FIG. 3). The shoe unit includes a conductive shoe 34, and a biasing assembly 36 that is configured to exert a force on the shoe, e.g., in the direction 38 of the extended position. When the apparatus is operably deployed onboard the vehicle and the actuator is controlled to move the shoe unit to the extended position, the conductive shoe is positioned to contact a conductive first running surface 40 (e.g., top surface or other surface of a metal rail) on which the vehicle travels. Concurrently, the biasing assembly presses the shoe against the running surface, for an increased degree or extent of contact between the shoe and running surface (relative to having no biasing assembly).

Figure 2:
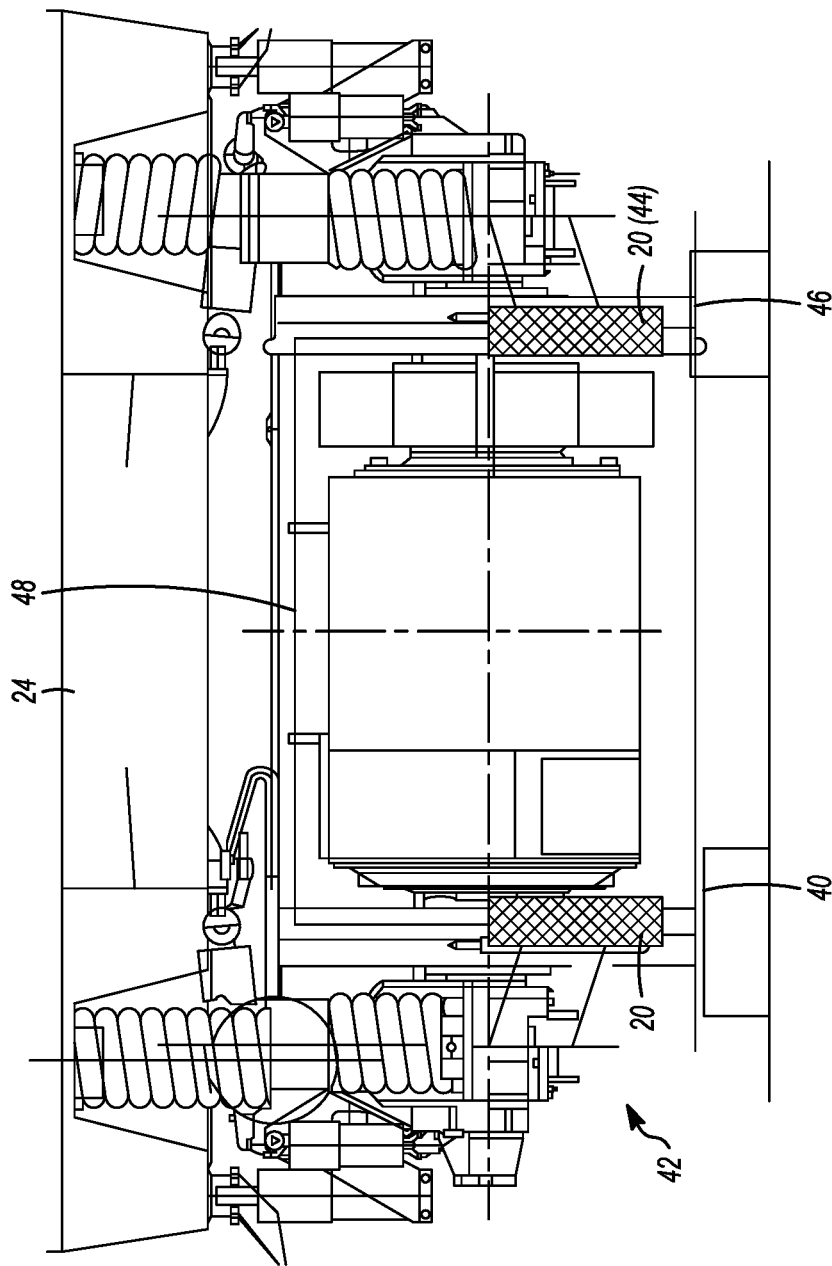
FIG. 2 illustrates an embodiment of a vehicle shunt system.

With reference to FIG. 2, in an embodiment, a system 42 (e.g., a vehicle shunt system for shunting conductive running surfaces) includes the shunt apparatus attached to the vehicle (rail vehicle or other vehicle), e.g., on one side of a vehicle, above or otherwise proximate in relation to the first running surface. A second shunt apparatus 44 (having a same configuration as the apparatus 20) may be attached to the vehicle in another location, e.g., on the other side of the vehicle, above or otherwise proximate in relation to a conductive second running surface 46 on which the vehicle operates. During installation, before the bracket assemblies are fixed in place to the vehicle, the shunt apparatuses are vertically and/or otherwise positioned relative to the running surfaces so that when the shoe units of the apparatuses are moved to the extended position, the conductive shoes contact the running surfaces with the biasing assemblies partly loaded. That is, in the position of contacting the running surfaces, the shoes are somewhere in the middle of their total possible range of travel (the range defined as between a first delimited position of the shoe closest to the actuator and a second delimited position of the shoe furthest away from the actuator), so that during movement along the running surfaces, the shoes can travel upwards against the force applied by the biasing assemblies (e.g., upon encountering debris) and can travel downwards under action of the biasing assemblies (e.g., once past the debris).

The system also includes an electrical conductor unit 48. The shoes of the two shunt apparatuses are electrically connected to one another by the electrical conductor unit, e.g., which extends under or through the vehicle between the sides of the vehicle. When the shoes are brought into contact with the respective running surfaces 40, 46, the running surfaces are electrically shunted by way of the electrical pathway of the shoes and electrical conductor unit. In one embodiment, the electrical conductor unit includes an insulated cable having a first end electro-mechanically connected (mechanically connected, such as by welding, soldering, or bolts, lugs, or other fasteners, and also electrically connected, by way of, e.g., a metal-to-metal contact) to the one shoe and a second end electro-mechanically connected to the other shoe. Alternatively, the electrical conductor unit may include plural conductors that are serially or otherwise connected to one another to establish a low resistance electrical path between the two shoes. For example, the electrical conductor unit could include: a first cable/wire that electrically connects to the shoe to a metal part of the mounting bracket assembly; the metal part of the mounting bracket assembly; a second cable/wire that electrically connects the metal part of the mounting bracket assembly to a metal part of the mounting bracket assembly of the other shunt apparatus; the metal part of the mounting bracket assembly of the other shunt apparatus; and a third cable/wire that electrically connects the metal part of the mounting bracket assembly of the other shunt apparatus to the other shoe. Other configurations are possible, such as the shunt apparatus including interconnected metal parts that together establish a low resistance pathway between the shoe and mounting bracket assembly, e.g., a conductive shoe attached to a metal biasing assembly attached to metal extension springs attached to a metal mounting bracket assembly (and to complete the low resistance pathway, e.g., a cable interconnecting the bracket assemblies of the two shunt assemblies).

Figure 3:
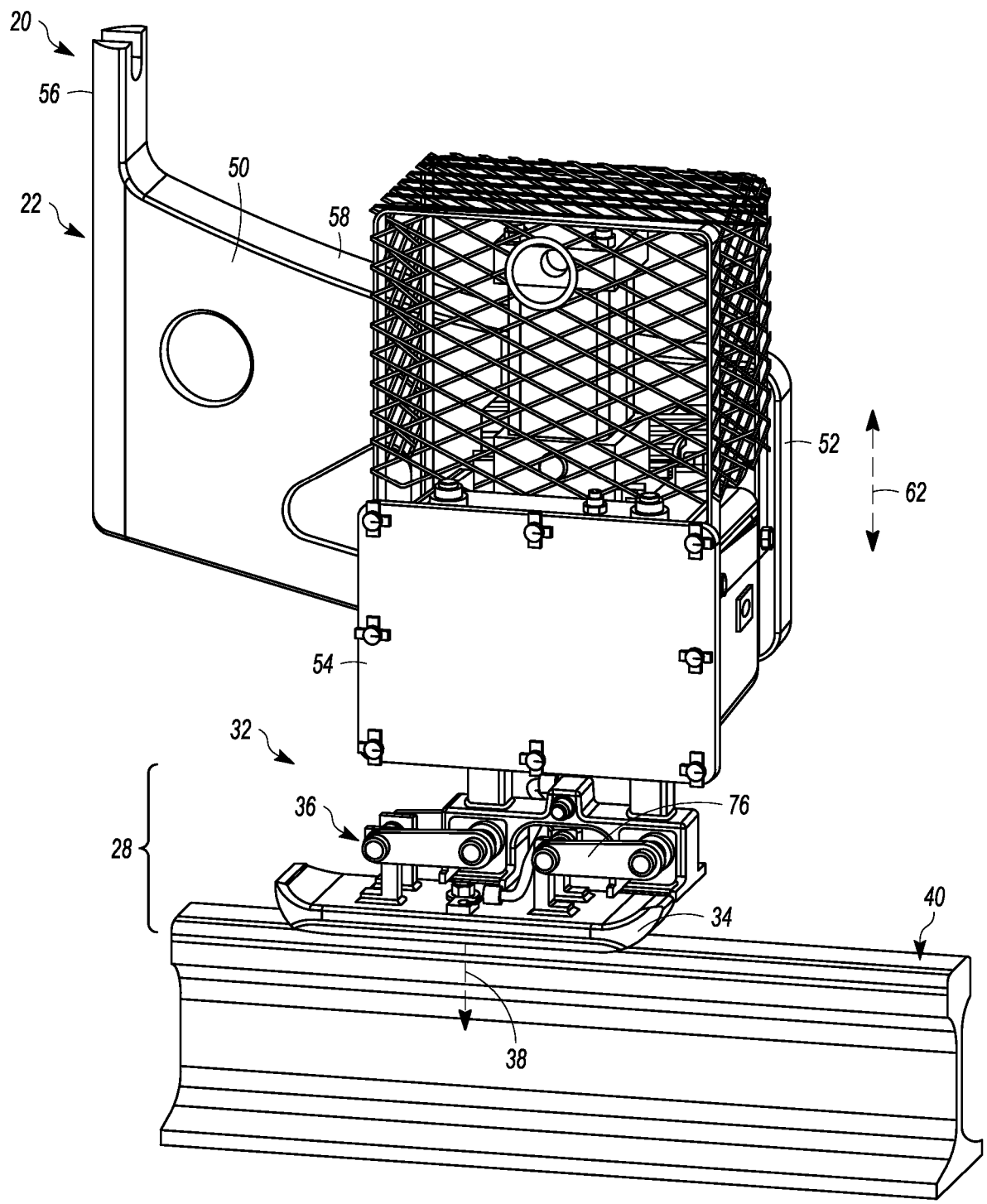
FIGS. 3 and 4 show the shunt apparatus of FIG. 1 in extended (actuated) and retracted (de-actuated) states, respectively.
Figure 4:
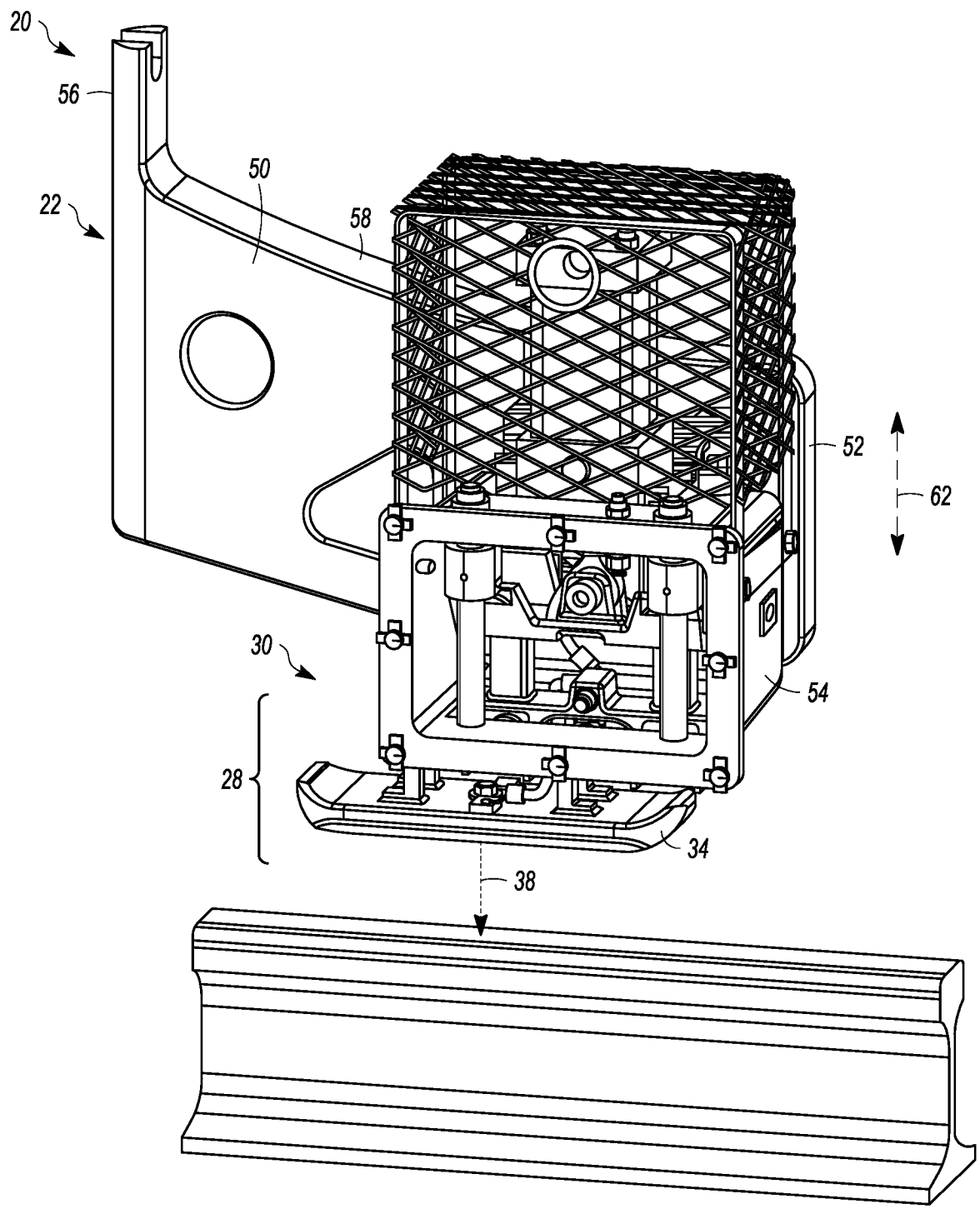

In an embodiment, with reference back to FIG. 1, the mounting bracket assembly may include an elongate bracket arm 50, a height adjustment member 52, and a housing 54 (shown with a cover or lid removed in FIGS. 1 and 4 and with the cover or lid in FIG. 3). The bracket arm has a first end portion 56 configured for attachment to the vehicle, and a distal, second end portion 58. The first and second end portions may be connected to one another by one or more vibration dampeners, e.g., polymer bushings or washers that are interposed between the first and second end portions where they connect to one another. Alternatively, the shunt apparatus may not include the vibration dampeners. The height adjustment member is attached to the second end of the bracket arm. The height adjustment member may be a vertically-oriented plate (as shown), a vertically-oriented slide arm (or arms), an elongate vertically-oriented lattice or ladder strip, or the like. (Vertical relative to when the shunt apparatus is installed on a vehicle.) The housing is adjustably fastened to the height adjustment member for selective positioning of the housing relative to the height adjustment member, along directions 62, to adjust a distance between the housing and a running surface when the apparatus is installed for use on the vehicle. For example, the housing may be removably but securely connected to the height adjustment member by bolts and nuts or other fasteners, with the height adjustment member having an array of holes or apertures for receiving the bolts or other fasteners at different, selectable positions of the housing. Alternatively or additionally, the housing may be removably attached with hooks, tabs-and-slots, clips, spot-welding, or the like. The housing defines an interior space, which may be fully or partially sealed, to reduce interior environmental contamination, while still providing a way for the actuator (inside the housing) to move the shoe unit. For example, the housing may have a lower opening, with a support member 64 of the biasing assembly (e.g., a rectangular or other plate) fitting snugly within the lower opening, to slidably move relative to the housing while still providing a sealing function to the interior. (The housing in FIGS. 1 and 3 is shown partially removed in order to show the interior space.)

As shown in FIG. 1, the actuator is disposed in the housing along with other components as discussed herein. A top end of the actuator is attached to the housing. A distal, other end of the actuator is attached to the shoe unit. As a function of the type of actuator used, actuation or activation of the actuator causes the actuator to expand, or a working member of the actuator to move, in either case downwards along the direction 38. The housing and actuator are provided with connection and/or through-pass/aperture features for connecting the actuator to a control line 66, which is in turn connected to a control system 68. For a pneumatic actuator, the control line may be, for example, a pneumatic supply line, and the control system may include a valve operably connected to the supply line for controllably providing and removing pressurized gas to and from the actuator (e.g., a valve configured to controllably apply pressure to the actuator and to vent pressure from the actuator to atmosphere). The control system may further include a switch or other control element for controlling the valve, e.g., from an operator cab, or the valve may be configured to be electrically controlled by an electronic vehicle controller. For an electrically-energized actuator, the control line may include one or more electrical wires or cables to apply an electric signal to the actuator, e.g., from a switch or from an electronic vehicle controller.

As shown in FIG. 1, in embodiments, the actuator of the shunt apparatus also may operate as an automatic return device. The automatic return device may be one or more internal elastic members inside the actuator that are configured to move the shoe unit back to the retracted position when the actuator is intentionally deactivated, and when the actuator is unintentionally deactivated, such as in a fault condition. The automatic return device may include at least one extension elastic member that interconnects the mounting bracket assembly and shoe unit. When the shoe unit is retracted and the actuator is deactivated, the at least one extension elastic member is slack and unloaded. When the actuator is activated to move the shoe unit to the extended position, the shoe unit pulls on the at least one extension elastic member, which stretches or expands to become loaded with potential mechanical energy. When the actuator is deactivated, the at least one extension elastic member is free to contract to its unloaded state, pulling the shoe unit back to the retracted position. The at least one elastic member may comprise two or more extension springs positioned on either side of or around the actuator, and interconnecting the housing top interior with the inwards-facing surface of the biasing assembly support member. Extension springs may be attached to the housing and support member by disposing loop ends of the springs on shaft elements attached to the housing or support member by bracket pairs.

Figure 5:
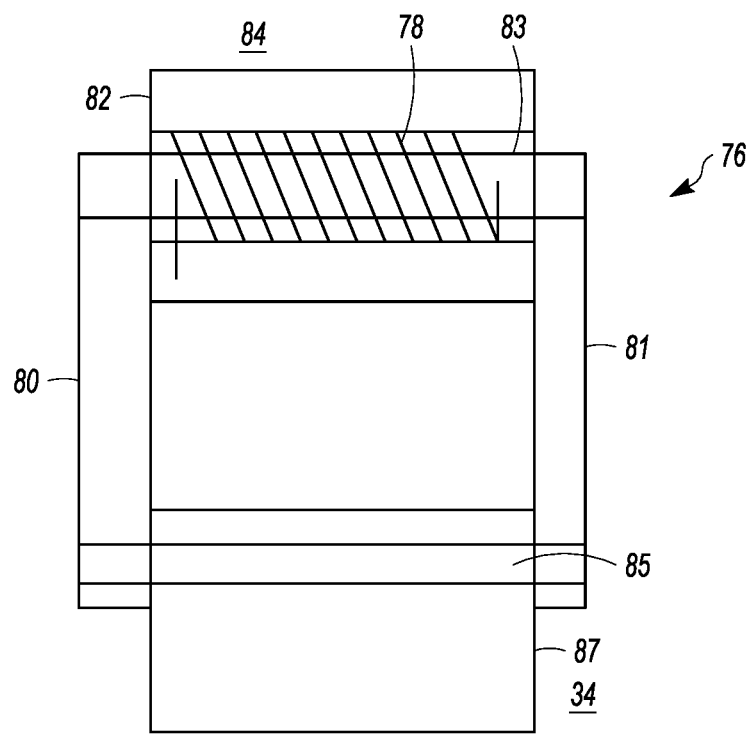
FIG. 5 is a top or plan view of an embodiment of a portion of a biasing assembly of a shunt apparatus.
Figure 6:
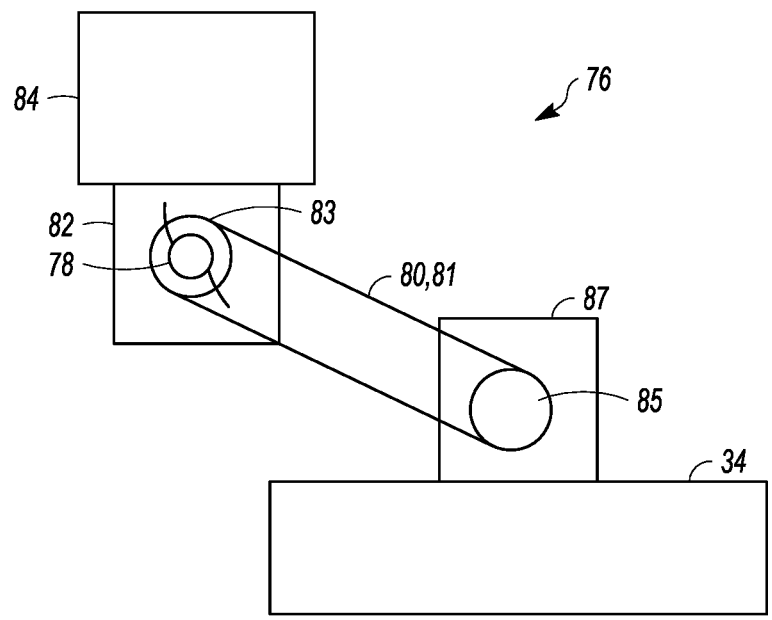
FIG. 6 is a side view of the portion of the biasing assembly shown in FIG. 5.

In embodiments, the shoe unit may include a support member 64 (e.g., support plate), the biasing assembly, and the conductive shoe. The support member is attached to the actuator and automatic return device (if provided) as discussed above. The biasing assembly is attached to the support member, and the shoe is in turn attached to the biasing assembly. The biasing assembly includes one or more resilient elements that, when the shunt apparatus is appropriately positioned on a vehicle relative to a running surface, exert a force on the shoe against the running surface and allow the shoe to move towards and away from the running surface (and, conversely, away from and towards the housing) within a delimited range of motion. In the embodiment of FIG. 1, and as further shown in FIG. 5 and FIG. 6, the biasing assembly includes at least two torsion units 76. Each torsion unit includes: a respective torsional elastic member 78 (e.g., torsion spring, rubber or other polymer member, etc.) operably connected to the support member; and a pair of pivot arms 80, 81. First ends of the pivot arms are operably connected to the torsional elastic member, and the conductive shoe is pivotally attached to second ends of the pivot arms. For example, the torsional elastic member may be loaded inside or around a cylindrical shaft 83 rotatably disposed between a pair of brackets attached to the support member, or within a cylindrical aperture of a unitary holder block 82 attached to the support member, with the pivot arms attached to the shaft and pivoting when the shaft rotates. The second ends of the pivot arms may be similarly connected to a second cylindrical shaft 85 that is rotatably disposed between a pair of brackets (or within a second unitary holder block 87) attached to the shoe. In operation, the pivoting connection of the pivot arms between the shoe and support member allows the shoe to move relative to the support member. The torsional elastic members, being operably loaded/coupled to the cylindrical shafts, provide resiliency for both receiving energy from the shoe and imparting the energy as force on the shoe, depending on the direction of shoe movement. For example, if the shoe is moved towards the support member, the torsional elastic members gain energy, and if the shoe is free to move away from the support member, the torsional elastic members in effect push the shoe in that direction, and if the shoe is statically positioned against a running surface in terms of the position of the shoe relative to the support member, the torsional elastic members exert a force on the shoe against the running surface.

As shown in FIG. 1, the biasing assembly may also include pedestals, platforms, stanchions, or the like 84, connected to the bottom or underside of the support member, for offsetting other portions of the biasing assembly (e.g., the block holders 82) away from the support member.

In operation, after installation on board a vehicle, the shunt assembly will initially be in an "off" or deactivated state, with the actuator unactuated (e.g., unpressurized) and the shoe unit positioned the retracted state, as shown in FIG. 4. To actuate the shunt assembly, a control signal is applied to the control line connected to the actuator, e.g., a valve is opened to allow a pressurized gas from a pneumatic line to enter the actuator. The actuator expands or is otherwise actuated, moving the shoe unit downwards towards the running surface. Concurrently, the extension springs or other extension elastic members are stretched or elongated to move from a slack, unloaded state to a loaded state. As the shoe unit moves downwards, the shoe initially contacts the running surface. As shown in FIG. 3, the shoe unit continues to move downwards, causing the shoe, now pressed against the running surface, to slide and pivot, such that the shoe lies closer to the support member and housing. This causes the biasing assembly (e.g., the torsional elastic members) to load, exerting a force down on the shoe against the running surface. When the actuator is de-actuated, the actuator no longer keeps the shoe unit in place, allowing the extension elastic members to contract/unload and pull the shoe unit back to the retracted position of FIG. 4.

In one aspect, an operational axis 88 of the actuator and a direction 38 of the force the biasing assembly is configured to exert on the shoe, when the apparatus is installed on the vehicle for use of the shoe to contact the running surface, may be both substantially normal (plus or minus five degrees) to the running surface. This reflects that the combined forces (of the actuator and the biasing assembly) are in line and serve to directly press the shoe down on the running surface. This may help the shoe to maintain a greater degree of tracking or contact with the running surface versus off-normal forces.

Figure 7:
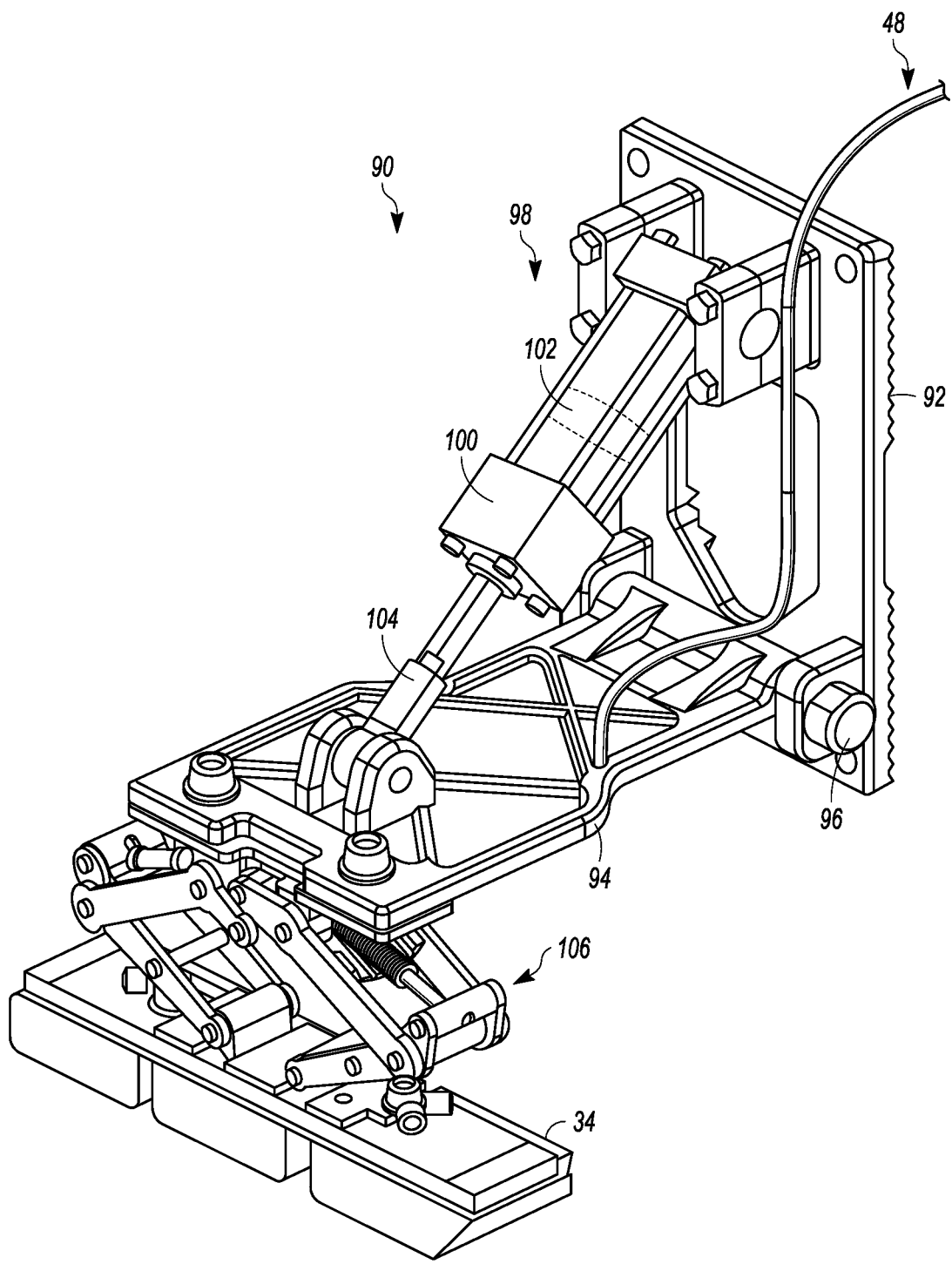
FIG. 7 illustrates another embodiment of a shunt apparatus.

FIG. 7 illustrates another embodiment of a shunt apparatus 90. The shunt apparatus might be applicable for attachment, for example, to the side of a car body. The apparatus 90 includes a mounting bracket assembly having a mounting bracket 92, and a shoe unit having a shoe support plate 94 pivotally connected to the mounting bracket (e.g., by a pivot pin 96). The apparatus also includes an actuator 98, which may be a mechanical fluidic actuator (e.g., pneumatic cylinder or hydraulic cylinder) having a cylinder unit 100, a piston 102 operably disposed in the cylinder unit (shown schematically in the figure), and a rod 104 attached to the piston inside the cylinder unit and extending external to the cylinder unit. One of the cylinder unit or the rod is pivotally attached to the mounting bracket and the other of the cylinder unit or the rod pivotally attached to the shoe support plate. The mechanical fluidic actuator 98 is configured, when actuated, to selectively pivot the shoe support plate to an extended position and to a retracted position. The apparatus also includes a biasing assembly 106 that is connected to an underside of a distal end of the shoe support plate opposite an end of the support plate where the support plate is pivotally connected to the mounting bracket. A shoe 34 is attached to the biasing assembly, and is configured to operate generally as described elsewhere herein. The biasing assembly may be a spring-loaded scissor-arm assembly (as illustrated), a biasing assembly as shown in the embodiment of FIG. 1, or as otherwise described elsewhere herein.

Figure 8:
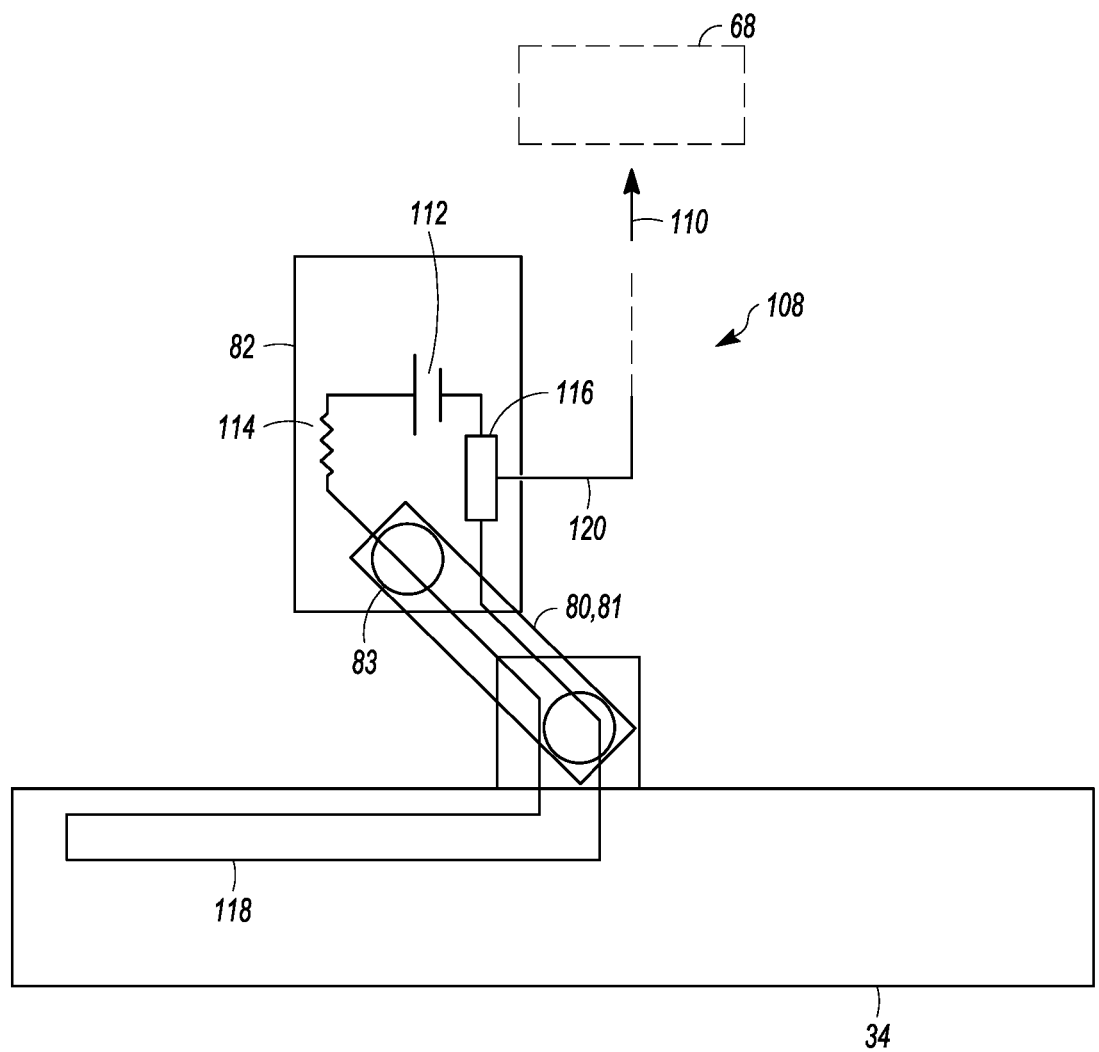
FIG. 8 illustrates part of a shunt apparatus having a sensor unit.

In another embodiment, with reference to FIG. 8, a shunt apparatus as described herein further includes a sensor unit 108. The sensor unit is configured to be operably interfaced with at least one of the mounting bracket assembly, the actuator, or the shoe unit. The sensor unit is also configured to detect a state of the shoe 34, and to generate a sensor signal 110 indicative of the state of the shoe that is detected. For example, the sensor signal may be generated responsive to (and thereby indicative of) the shoe breaking off from the rest of the shunt apparatus. In one example, as shown in FIG. 8, the sensor unit may comprise a battery or other voltage source 112, a resistor 114 electrically connected to the voltage source, and a voltage detector 116 electrically connected to the voltage source or the resistor, all positioned on or in, e.g., a holder block 82 (or other location off the shoe). The sensor unit also includes a circuit trace or other conductor 118 extending from the voltage source/resistor/voltage detector, down along or through the pivot arms, on or around the shoe, back up along or through the pivot arms, and back to the voltage source/resistor/voltage detector, to complete a circuit path. Another conductor (e.g., cable or wire) connects the voltage detector to a controller. In operation, normally the voltage detector outputs a signal indicating the presence of a voltage, due to the presence of a complete circuit. If the shoe breaks away from the shunt apparatus, however, the circuit trace 118 will break away along with it, creating an open circuit condition. This causes the voltage detector to deactivate, or to generate a signal indicative of the lack of a voltage. In either case, the presence or absence of a designated signal conveys information 110 to the controller of the open circuit, as likely caused by a breakaway shoe. The controller may be configured to automatically control the shunt apparatus, and/or all the shunt apparatuses onboard the vehicle, to move the shoe units to the retracted (e.g., failsafe) position, responsive to a signal indicative that a shoe may have broken away. Other possible sensor units may include other frangible links between the shoe and the rest of the shunt apparatus, optical sensors, video sensors, pressure switches (e.g., the presence of the shoe actuates a switch, but if the shoe breaks away the switch is deactivated), etc. In another example, a cable is mechanically attached to the shoe, and to a circuit trace positioned off the shoe; the circuit trace is part of an off-shoe circuit as described above, for example. If the shoe breaks away, the cable is configured to break away with the shoe, with the other end of the cable detaching from and severing the off-shoe circuit trace, creating an open circuit condition. This avoids the need for running a circuit trace down the pivot arms and shoe.

In another embodiment, a controller may be configured to automatically or otherwise control one or more shunt apparatuses onboard a vehicle for the shoe units to move to the retracted position, responsive to one or more of: receiving a signal indicative of a breakaway shoe (as described above) or other shunt failure state; receiving a signal indicative of a detected obstruction along a route on which the vehicle travels; weather information; vehicle location information; information on whether sand is being applied to the wheels or running surface; information on whether lubrication is being applied to the wheels or running surface; information on operational states or conditions of the vehicle; etc.

In embodiments, the shunt assemblies deployed onboard a locomotive or other rail vehicle. The shunt assemblies may be attached to a car body of the vehicle, to a frame of the vehicle, to trucks/bogies of the vehicle, etc. In one embodiment, the shunt assemblies are attached to pre-existing sanding brackets onboard the vehicle. Such sanding brackets are typically positioned in the vehicle undercarriage, near the underlying tracks, and are used to hold sanding applicators (e.g., applicator valves and supply lines) that controllably apply sand to rail surfaces for traction purposes. It may be that not all the sanding brackets of a vehicle are currently in use (i.e., only some of the sanding brackets may be currently holding sanding-related equipment), in which case the shunt assemblies may be attached to the unused sanding brackets.

In an embodiment, a method (e.g., method of operating a vehicle) includes activating actuation units of first and second shunt apparatuses attached to a vehicle to move respective shoe units of the shunt apparatuses to an extended position where respective conductive shoes of the shoe units contact first and second conductive running surfaces on which the vehicle travels, wherein the shoes are electrically interconnected for shunting the running surfaces when the shoes contact the running surfaces; and, with respective biasing assemblies of the shoe units, exerting a force to press the shoes against the running surfaces when the shoes contact the running surfaces during movement of the vehicle.

In another embodiment of the method, the method further includes retracting the shoe units to a retracted position where the shoes do not contact the running surfaces responsive to one or more of deactivation of the actuation units or failure of the actuation units.

In another embodiment of the method, the method further includes deactivating the actuation units to move or cause the shoe units to be moved to a retracted position where the shoes do not contact the running surfaces, responsive to receiving a signal indicative of one of the shoes having broken away or a signal indicative of a detected obstruction along a route on which the vehicle travels.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A shunt apparatus comprising:
   a mounting bracket assembly configured for connection to a vehicle;
   an actuator connected to the mounting bracket assembly; and
   a shoe unit comprising a biasing assembly connected to the actuator and a conductive shoe attached to the biasing assembly,
   wherein the actuator is controllable to selectively move the shoe unit from a retracted position to an extended position, wherein the conductive shoe is configured to be positioned to contact a conductive first running surface on which the vehicle travels while the shunt apparatus is connected to the vehicle for use and the shoe unit is in the extended position, for an electrical connection between the shoe and the first running surface, and wherein the biasing assembly is configured to exert a force on the shoe for pressing the shoe against the first running surface during movement of the vehicle,
   wherein the biasing assembly of the shoe unit comprises a support member connected to the actuator and at least two torsion units, each torsion unit respectively comprising a torsional elastic member connected to the support member and a pair of pivot arms, wherein first ends of the pivot arms are connected to the torsional elastic member, and the conductive shoe is pivotally attached to second ends of the pivot arms.

2. The apparatus of claim 1, further comprising:
   an electrical conductor unit electrically connected to the shoe, wherein the electrical conductor unit is configured to be also electrically connected to another conductive shoe of another shunt apparatus connected to the vehicle, for establishing an electrical shunt between the first running surface and a conductive second running surface which the another conductive shoe is configured to contact during the movement of the vehicle.

3. The apparatus of claim 1, wherein the actuator includes a pneumatic cylinder.

4. The apparatus of claim 1, wherein the actuator is configured to dampen vibrational movement between the shoe unit and mounting bracket assembly when pressurized with a working fluid.

5. The apparatus of claim 4, wherein the actuator comprises a pneumatic bellows configured for attachment to a pneumatic supply line of the vehicle, the pneumatic bellows configured to expand to move the shoe unit to the extended position upon receiving pressurized gas from the pneumatic supply line.

6. The apparatus of claim 4, wherein an operational axis of the actuator and a direction of the force the biasing assembly is configured to exert on the shoe, when the apparatus is installed on the vehicle for use of the shoe to contact the running surface, are both substantially normal to the running surface.

7. The apparatus of claim 1, wherein the mounting bracket assembly comprises an elongate bracket arm, a height adjustment member, and a housing, the bracket arm having a first end configured for attachment to the vehicle, and the height adjustment member attached to a second end of the bracket arm, wherein the housing is adjustably fastened to the height adjustment member for selective positioning of the housing relative to the height adjustment member, to adjust a distance between the housing and the running surface when the apparatus is installed for use on the vehicle, and wherein the actuator is at least partially positioned within the housing.

8. The apparatus of claim 1, wherein the shoe is comprised of one or more of ductile iron, cast iron, cast gray iron, or steel.

9. The apparatus of claim 1, further comprising:
   a sensor unit configured: to be operably interfaced with at least one of the mounting bracket assembly, the actuator, or the shoe unit; to detect a state of the shoe; and to generate a sensor signal indicative of the state of the shoe that is detected.

10. The apparatus of claim 9, further comprising:
    a controller configured to control the actuator for the shoe unit to be moved to the retracted position responsive to the sensor signal being indicative of the shoe having broken away from the apparatus.

11. A vehicle comprising:
    a first shunt apparatus as recited in claim 1 or any other claim, wherein the mounting bracket assembly of the first shunt apparatus is attached to a first side of the vehicle, and wherein the shoe of the first shunt apparatus is configured to contact the first running surface when the actuator of the first shunt apparatus is controlled to move the shoe unit of the first shunt apparatus to the extended position;
    a second shunt apparatus as recited in claim 1 or any other claim, wherein the mounting bracket assembly of the second shunt apparatus is attached to a second side of the vehicle, and wherein the shoe of the second shunt apparatus is configured to contact a second running surface when the actuator of the second shunt apparatus is controlled to move the shoe unit of the second shunt apparatus to the extended position; and
    an electrical conductor unit electrically coupled to the shoe of the first shunt apparatus and to the shoe of the second shunt apparatus, for shunting the first and second running surfaces when the shoes contact the running surfaces.

12. The vehicle of claim 11, wherein the electrical conductor unit comprises an insulated electrical cable having a first end electrically connected to the shoe of the first shunt apparatus and a second end electrically connected to the shoe of the second shunt apparatus.

13. The apparatus of claim 1, wherein:
    the mounting bracket assembly comprises a mounting bracket;
    the shoe unit comprises a shoe support plate pivotally connected to the mounting bracket;

the actuator comprises a mechanical fluidic actuator having a cylinder unit, a piston operably disposed in the cylinder unit, and a rod attached to the piston inside the cylinder unit and extending external to the cylinder unit, one of the cylinder unit or the rod pivotally attached to the mounting bracket and the other of the cylinder unit or the rod pivotally attached to the shoe support plate, wherein the mechanical fluidic actuator is configured, when actuated, to selectively pivot the shoe support plate to the extended position and to the retracted position; and the biasing assembly is connected to an underside of a distal end of the shoe support plate opposite an end of the support plate where the support plate is pivotally connected to the mounting bracket.

14. A shunt apparatus comprising:

a mounting bracket assembly configured for connection to a vehicle;

an actuator connected to the mounting bracket assembly; and a shoe unit connected to the actuator, wherein the actuator is controllable to move the shoe unit to an extended position where a conductive shoe of the shoe unit is positioned to contact a conductive first running surface, wherein the shoe unit comprises a biasing assembly configured to exert a force on the shoe to press the shoe against the running surface during movement of the vehicle, wherein the biasing assembly of the shoe unit comprises a support member connected to the actuator and at least two torsion units, each torsion unit respectively comprising a torsional elastic member connected to the support member and a pair of pivot arms, wherein first ends of the pivot arms are connected to the torsional elastic member, and the conductive shoe is pivotally attached to second ends of the pivot arms.

15. The apparatus of claim 14, further comprising:

an electrical conductor unit having a first end electrically coupled to the shoe and a second end configured for electrical attachment to another shoe of another shunt apparatus operably connected to the vehicle, to electrically shunt the first running surface and a conductive second running surface when the shoe and the another shoe contact the first and second running surfaces.

16. The apparatus of claim 14, further comprising:

at least one extension elastic member interconnecting the shoe unit and the bracket assembly, wherein the at least extension elastic member is configured to pull the shoe unit back to a retracted position when the actuator is deactivated.

17. A method comprising:

activating actuation units of first and second shunt apparatuses attached to a vehicle to move respective shoe units of the shunt apparatuses to an extended position where respective conductive shoes of the shoe units contact first and second conductive running surfaces on which the vehicle travels, wherein the shoes are electrically interconnected for shunting the running surfaces when the shoes contact the running surfaces; and with respective biasing assemblies of the shoe units, exerting a force to press the shoes against the running surfaces when the shoes contact the running surfaces during movement of the vehicle, wherein in each shoe unit, a biasing assembly of the shoe unit comprises a support member connected to an actuator and at least two torsion units, each torsion unit respectively comprising a torsional elastic member connected to the support member and a pair of pivot arms, wherein first ends of the pivot arms are connected to the torsional elastic member, and the conductive shoe is pivotally attached to second ends of the pivot arms.

18. The method of claim 17, further comprising:

retracting the shoe units to a retracted position where the shoes do not contact the running surfaces responsive to one or more of deactivation of the actuation units or failure of the actuation units.

19. The method of claim 17, further comprising:

deactivating the actuation units to move or cause the shoe units to be moved to a retracted position where the shoes do not contact the running surfaces, responsive to receiving a signal indicative of one of the shoes having broken away or a signal indicative of a detected obstruction along a route on which the vehicle travels.

* * * * *